T. J. ELLISON.
ANIMAL TRAP.
APPLICATION FILED DEC. 12, 1912.
1,066,004.
Patented July 1, 1913.
2 SHEETS—SHEET 2.
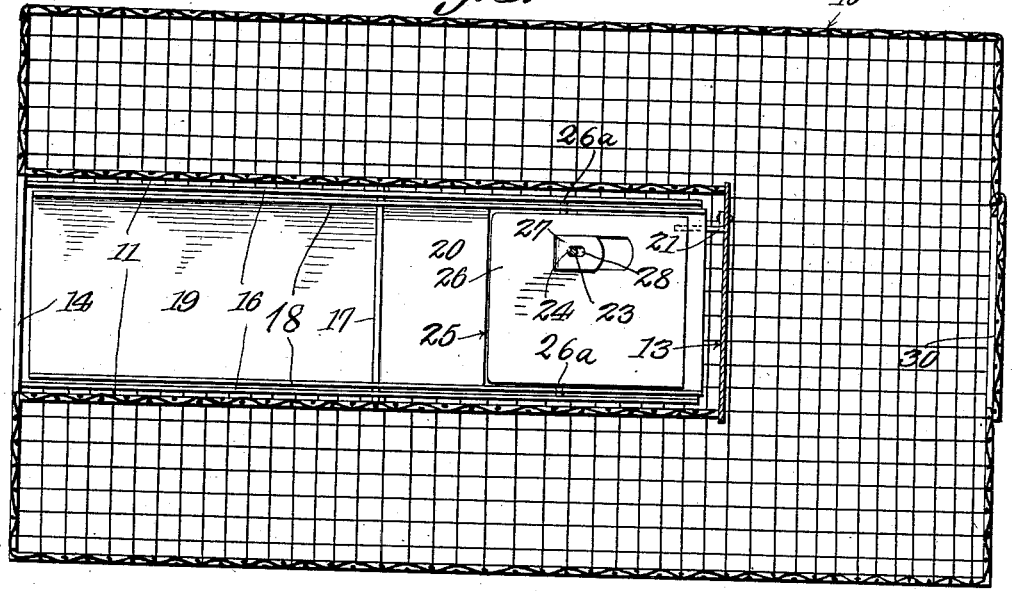
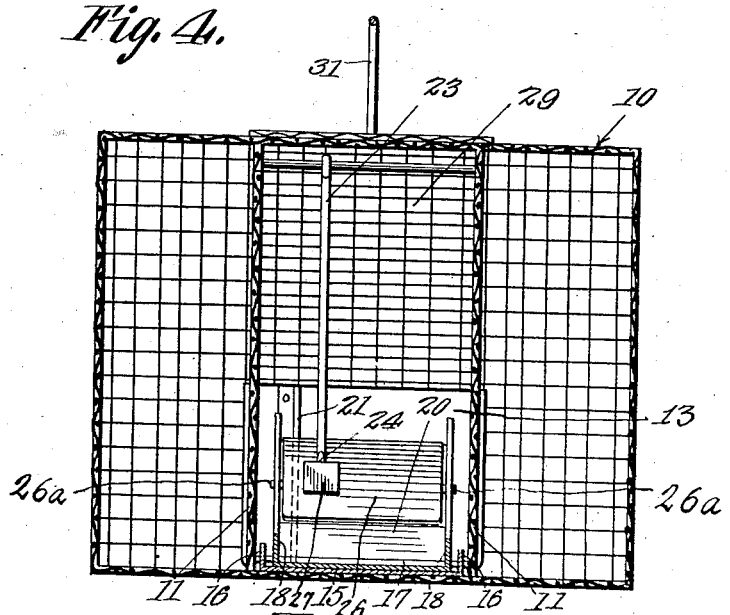
WITNESSES
Thomas J. Ellison INVENTOR,
Attorney

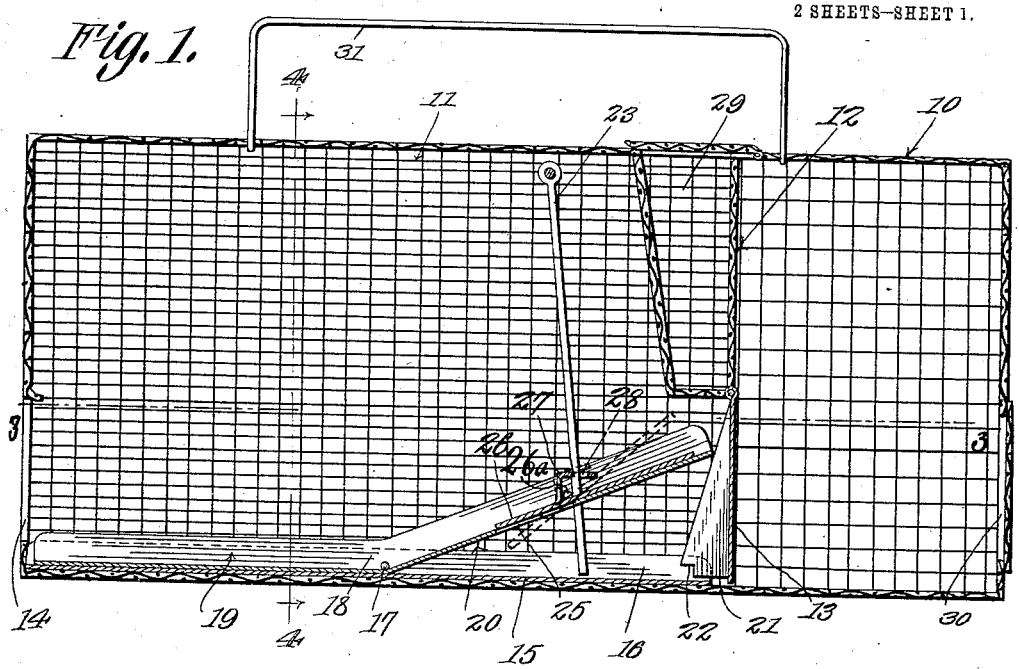
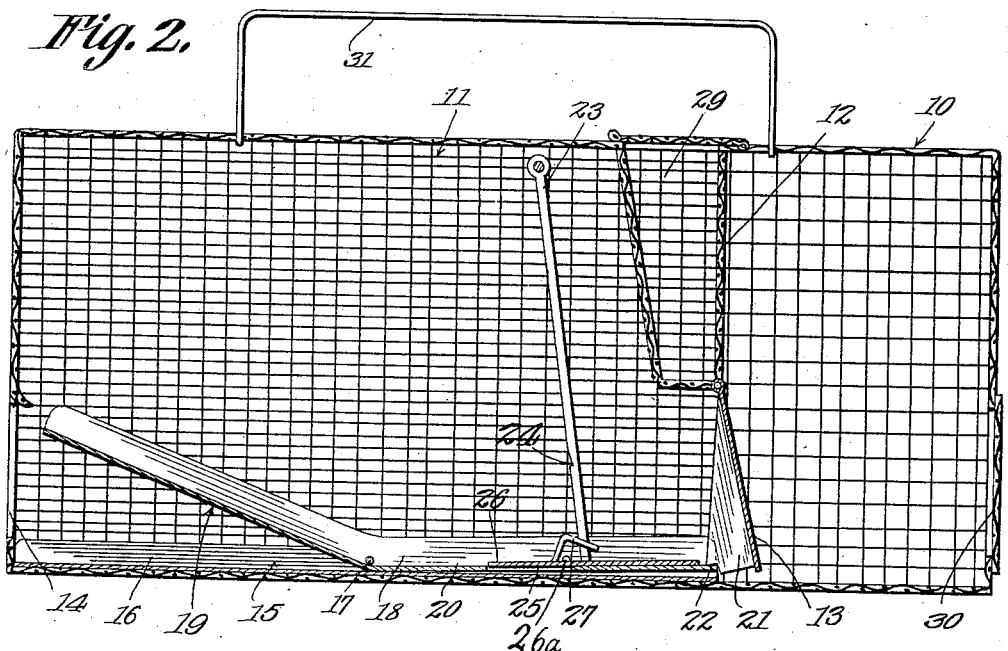

UNITED STATES PATENT OFFICE.

THOMAS J. ELLISON, OF TERRILL, KENTUCKY.

ANIMAL-TRAP.

1,066,004.  Specification of Letters Patent.  Patented July 1, 1913.

Application filed December 12, 1912. Serial No. 736,365.

*To all whom it may concern:*

Be it known that I, THOMAS J. ELLISON, a citizen of the United States, residing at Terrill, in the county of Madison and State of Kentucky, have invented certain new and useful Improvements in Animal-Traps, of which the following is a specification.

This invention relates to traps which are automatically reset after being sprung, and thus set for the next animal.

The trap has two compartments, the first one to be entered by the animal containing a tilting platform which serves as a closure for said compartment and also as a means for opening the door of the second compartment. Thus when the animal enters the first compartment the entrance thereto is closed and the door to the second compartment opens, and after the animal passes into the second compartment said door closes and the entrance to the first compartment opens and the trap is reset.

It is the object of the present invention to provide a novel construction and arrangement of tilting platform and other parts associated therewith, whereby the herein described operation is effected without liability of failure, and also to provide a structure which is devoid of complicated parts to get out of order.

In order that the invention may be better understood, reference is had to the accompanying drawings, in which—

Figure 1 is a longitudinal sectional view of the trap showing the same set. Fig. 2 is a similar view showing the parts in another position. Fig. 3 is a horizontal section on the line 3—3 of Fig. 1. Fig. 4 is a cross-section on the line 4—4 of Fig. 1.

As shown in the drawings, the body 10 of the trap may be constructed of wire as shown, the same comprising a top, a bottom, sides, and front and rear ends arranged to form a rectangular inclosure. In this inclosure are two longitudinal partitions 11 extending from the front end and terminating some distance from the rear end of the inclosure. These partitions extend between the top and bottom of the inclosure and at their rear ends the space therebetween is closed by a transverse wall 12. The partitions 11 and wall 12 form a compartment which is cut off entirely from the remainder of the inclosure except for an opening in the wall 12 which is controlled by a door 13. The space within the inclosure surrounding the compartment forms a second compartment to receive and confine the trapped animals. In the front wall of the inclosure is an opening 14 through which access is had into the first-mentioned compartment.

On the bottom or floor of the inclosure, between the partitions 11, is mounted a plate 15 having upstanding flanges 16 at its longitudinal edges, formed by bending up the plate. Above this plate is mounted a tilting platform which is hinged on a rod 17 extending transversely between the flanges 16 and passing through upstanding flanges 18 on the longitudinal edges of the platform. The platform comprises front and rear portions 19 and 20, respectively, which are angularly disposed to one another, the hinge or pivot being at the angle. The front end of the platform swings up and down across the opening 14, and the opposite end of the platform is located to swing up and down in front of the door 13.

On that side of the door 13 which is opposite the end of the rear portion 20 of the platform is an outstanding flange 21 the outer edge of which is inclined, and at the bottom of the flange is a shoulder 22 forming an abutment adapted to be engaged by the platform as will be presently described.

In the compartment formed by the partitions 11 is a depending rod 23 having a notch 24 near its lower end. This rod is loosely suspended from the top of the inclosure and is designed to lock the platform in set position. The part 20 of the platform has an opening 25 over which is pivoted a trigger plate 26 having a bent up tongue 27 provided with an aperture 28 through which the rod passes, the edge of the aperture being designed to engage the notch 24. The plate 26 has trunnions 26ª projecting from its longitudinal edges, which trunnions extend into apertures in the flanges 18, and thus form the pivot of said plate.

Above the door 13, the wall 12 carries a bait compartment 29 which incloses the bait so that the animals cannot get to it to destroy it.

The rear wall of the trap has a door 30 for removal of the trapped animals, and to the top of the trap is connected a bail 31 for carrying the same.

Fig. 1 shows the trap set. The front end 19 of the platform is down, which leaves the entrance 14 open and unobstructed so that the animal may enter. The rear portion 20 of the platform extends upward at an inclination and is in contact with the inclined edge of the door flange 21 near the top thereof. The trigger 27 engages the notch 24. The rat or other animal, attracted by the bait in the compartment 29, enters the trap through the opening 14 and passes along the front portion of the platform and up the inclined rear portion thereof in its effort to get at the bait. When the animal steps on the plate 26, the same tilts and releases the trigger 27, whereupon the platform is released and its rear portion tilts down. When the platform tilts as stated, it slides down the flange 21 and its end comes under the shoulder 22. The front portion of the platform has tilted upward to close the entrance 14, and the platform is now locked in this position. The animal now has its escape cut off and can pass only into the second compartment through the door 13, which is hinged at the top and swings open into said compartment. When the animal passes through the door 13, the shoulder 22 swings away from the edge of the platform, and the latter tilts back to its normal position, its rear end rising, and its front end dropping down to open the entrance 14. At the same time the trigger again locks the platform, and the trap is now reset for the next animal. The front end of the platform is slightly heavier than its rear end so that it will always swing to set position when the door 13 swings open.

A trap constructed as herein described is reliable and efficient in operation, and it has no complicated parts to get out of order. After the trap is baited and initially set, its operation thereafter is entirely automatic.

I claim:

1. An animal trap comprising a compartment having an entrance, a second compartment, a door controlling the animal's passage from the first compartment into the second compartment, a platform in the first compartment and tiltable to open and close the entrance, a trigger, means engageable by the trigger for holding the platform in position to leave the entrance open, a plate pivoted to the platform and carrying the trigger, and means on the door and releasable by the opening thereof for locking the platform in position to close the entrance.

2. An animal trap comprising a compartment having an entrance, a second compartment, a door controlling the animal's passage from the first compartment into the second compartment, a platform in the first compartment and tiltable to open and close the entrance, a rod depending into the first compartment and having a notch, a trigger engageable with the notch for holding the platform in position to leave the entrance open, a plate pivoted to the platform and carrying the trigger, and means on the door and releasable by the opening thereof for locking the platform in position to close the entrance.

In testimony whereof I affix my signature in presence of two witnesses.

THOMAS J. ELLISON.

Witnesses:
S. P. DEATHERAGE,
S. S. PARKES.

Copies of this patent may be obtained for five cents each, by addressing the "Commissioner of Patents, Washington, D. C."